US009665530B2

(12) United States Patent
Ao et al.

(10) Patent No.: US 9,665,530 B2
(45) Date of Patent: May 30, 2017

(54) METHOD AND SYSTEM FOR IMPLEMENTING ELASTIC NETWORK INTERFACE AND INTERCONNECTION

(75) Inventors: Ting Ao, Shenzhen (CN); Jinghai Yu, Shenzhen (CN); Yuehua Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 875 days.

(21) Appl. No.: 14/113,027

(22) PCT Filed: Mar. 31, 2012

(86) PCT No.: PCT/CN2012/073429
§ 371 (c)(1),
(2), (4) Date: Jan. 7, 2014

(87) PCT Pub. No.: WO2012/142910
PCT Pub. Date: Oct. 26, 2012

(65) Prior Publication Data
US 2014/0115189 A1    Apr. 24, 2014

(30) Foreign Application Priority Data
Apr. 21, 2011   (CN) .......................... 2011 1 0100690

(51) Int. Cl.
*G06F 15/16* (2006.01)
*H04L 12/709* (2013.01)
(Continued)

(52) U.S. Cl.
CPC .......... *G06F 15/161* (2013.01); *H04L 45/245* (2013.01); *H04L 41/0654* (2013.01);
(Continued)

(58) Field of Classification Search
CPC ... H04L 45/245; H04L 41/0654; H04L 45/28; G06F 15/161; Y02B 60/33; Y02B 60/43
(Continued)

(56) References Cited

U.S. PATENT DOCUMENTS

| 7,336,605 B2 | 2/2008 | Bruckman et al. |
| 2010/0020680 A1* | 1/2010 | Salam ................. H04L 43/0811 370/225 |

(Continued)

FOREIGN PATENT DOCUMENTS

| CN | 101014040 A | 8/2007 |
| CN | 101577717 A | 11/2009 |

(Continued)

OTHER PUBLICATIONS

International Search Report for corresponding application PCT/CN2012/073429 filed Mar. 31, 2012; Mail date Jul. 5, 2012.
(Continued)

*Primary Examiner* — Andrew Chriss
*Assistant Examiner* — Ellen Kirillova
(74) *Attorney, Agent, or Firm* — Cantor Colburn LLP

(57) ABSTRACT

The disclosure provides a method and system for implementing a resilient network interface and interconnection. The method includes: aggregating one or multiple aggregation ports on one or multiple nodes into one DLAG; and implementing a distributed resilient network interface by the DLAG. Through the disclosure, the problem that the existing ring network and other protection technologies cannot ensure normal transmission of traffic in an arbitrary network is solved, thereby effectively ensuring normal operation of a service in the network and improving the reliability of the network interface and the utilization rate of the link.

18 Claims, 7 Drawing Sheets

(51) Int. Cl.
*H04L 12/703* (2013.01)
*H04L 12/24* (2006.01)

(52) U.S. Cl.
CPC ............... *H04L 45/28* (2013.01); *Y02B 60/33* (2013.01); *Y02B 60/43* (2013.01)

(58) Field of Classification Search
USPC ........................................................ 370/419
See application file for complete search history.

(56) References Cited

U.S. PATENT DOCUMENTS

| | | | | |
|---|---|---|---|---|
| 2010/0157844 A1* | 6/2010 | Casey | ..................... | H04L 45/02 370/254 |
| 2010/0329147 A1 | 12/2010 | Nam | | |
| 2011/0075554 A1* | 3/2011 | Holness | ..................... | H04L 1/22 370/228 |
| 2011/0085570 A1 | 4/2011 | Kotha | | |
| 2012/0236859 A1* | 9/2012 | Subramanian | ........ | H04L 45/245 370/392 |

FOREIGN PATENT DOCUMENTS

| | | |
|---|---|---|
| EP | 2252015 A1 | 11/2010 |
| WO | 2010069041 | 6/2010 |

OTHER PUBLICATIONS

Extended European Search Report for corresponding application EP 12 77 4303; Report dated Dec. 3, 2014.
Rick van't Spijker, "Multiple Systems Link Aggregation Control Protocol", Apr. 2011., vol. 802.1, pp. 1-78, XP068008118.
Stephen Haddock, "Resilient Network Interconnect, D-Lag Models", Extreme Networks, Oct. 19, 2010, vol. 802. 1, pp. 1-16, XP017643212.

* cited by examiner

METHOD AND SYSTEM FOR IMPLEMENTING ELASTIC NETWORK INTERFACE AND INTERCONNECTION

TECHNICAL FIELD

The disclosure relates to the field of communications, and particularly to a method and system for implementing a resilient network interface and a method for implementing resilient network interconnection.

BACKGROUND

With the rapid development of bandwidth services, interconnection between networks is more and more widely used and more services can be carried. There are various methods for protecting a link and nodes thereon according to the employed technologies inside the network. As the protection demand on the traffic is stronger and the requirements are higher, some operators also propose the demand to implement traffic protection in the case of network interconnection. Here, traffic protection can be implemented in the manner of link aggregation, such as port aggregation or loop protection. Currently, what is supported by common link aggregation standards is port aggregation on one node, which therefore is merely suitable for link protection. Hence, in the current link aggregation technologies, the protection to the node cannot be implemented on a network edge interface.

There are diversified methods for the networking at the interconnection area between networks. In order to protect the link and at the same time protect the edge node so as to ensure the normal transmission of services, a network interconnection protection method of link and node dual-redundancy is proposed in the related art, such as the loop network protection technology of G.8032 standard. However, this technology is merely suitable for some network topologies and not suitable for the situation where the interconnection part between networks employs a full-network connection method, and therefore, this technology cannot ensure the normal transmission of traffic in an arbitrary network.

Regarding the problem in the related art that the normal transmission of traffic in an arbitrary network cannot be ensured, no effective solution is proposed currently.

SUMMARY

The embodiments of the disclosure provide a method and system for implementing a resilient network interface and a method for implementing resilient network interconnection, so as to at least solve the problem that the normal transmission of traffic in an arbitrary network cannot be ensured.

According to an embodiment of the disclosure, a method for implementing a resilient network interface is provided, including: aggregating one or multiple aggregation ports on one or multiple nodes into one distributed link aggregation group (DLAG); and implementing a distributed resilient network interface by the DLAG.

In the above, aggregating multiple aggregation ports on the one or multiple nodes into one DLAG includes: containing one DLAG internal coordinator (LIC) unit on each of the one or multiple nodes, wherein the LIC unit is used for implementing exchange of parameters and coordination of information among the multiple nodes; and the LIC unit ensuring that one or multiple aggregation ports on the one or multiple nodes can work as one DLAG.

The LIC unit implementing the exchange of parameters and the coordination of information among the multiple nodes includes: exchanging aggregation parameters among the multiple nodes through the LIC unit; and exchanging aggregation port information among the multiple nodes through the LIC unit.

The LIC unit ensuring that the multiple aggregation ports on the one or multiple nodes can work as one DLAG includes: under the coordination of the LIC unit, the one or multiple nodes obtaining consistent aggregation parameters.

The LIC unit ensuring that the multiple aggregation ports on the one or multiple nodes can work as one DLAG includes: one or multiple nodes which have the consistent aggregation parameters working as one logic node, connecting the one or multiple nodes which have the consistent aggregation parameters by using one or more links for interaction and negotiation of the LIC unit as one or more intra-portal links.

The LIC unit ensuring that the multiple aggregation ports on the one or multiple nodes can work as one DLAG includes: exchanging aggregation port information among the one or multiple nodes under the coordination of the LIC unit, and adding aggregation ports of the one or multiple nodes into the DLAG.

Aggregating the multiple aggregation ports on the one or more nodes into one DLAG includes: creating one or more corresponding virtual aggregator multiplexers and one or more corresponding virtual aggregator parsers on the one or more nodes.

Creating one or more corresponding virtual aggregator multiplexers and one or more corresponding virtual aggregator parsers on the one or more nodes includes: a node receiving the aggregation port information of other nodes, creating one or more virtual aggregator multiplexers corresponding to one or more aggregation links on the other nodes according to the aggregation port information, and creating one or more virtual aggregator parsers corresponding to the other nodes.

Aggregating the multiple aggregation ports on the one or more nodes into one DLAG includes: containing a service gateway unit, which is used for determining which gateway the traffic of the DLAG should pass into or out of, on each of the one or more nodes.

The gateway is a specific node, by which traffic flowing from a terminal network or flowing into the terminal network is forwarded.

Implementing the distributed resilient network interface by the DLAG includes: when the service gateway unit receives a frame from a frame collector, determining which service gateway the frame should pass into or out of; if the service gateway which the frame should pass into or out of is the node where the service gateway unit is located, the service gateway unit sending the frame into a MAC relay for forwarding the frame to the internal of the network of the node; and if the service gateway which the frame should pass into or out of is not the node where the service gateway unit is located, the service gateway unit sending the frame to the node where the service gateway which the frame should pass into or out of is located via an intra-portal link.

The method further includes: exchanging information of frame-to-gateway assignment and/or frame-to-aggregation port among multiple nodes through the LIC unit.

In the above, the service to which the frame belongs is represented using a virtual local area network identifier (VLAN-ID) or represented using a backbone service instance identifier (I-SID).

The method further includes: when an aggregation port in a node is removed, notifying other nodes, which are connected with the node via an intra-portal link, of information regarding an aggregation port is removed; the other nodes deleting the virtual aggregator multiplexer corresponding to the removed aggregation port; and once a group of virtual aggregator multiplexers, which correspond to the node where the removed aggregation port is located, on the other nodes are all removed, the other nodes deleting the virtual aggregator parser corresponding to the node where the removed aggregation port is located.

Aggregating one or multiple aggregation ports on multiple nodes into one DLAG includes: exchanging aggregation parameters through LIC units among the multiple nodes and performing negotiation, and when consistent aggregation parameters are get, aggregating one or multiple aggregation ports on the multiple nodes into one DLAG.

The aggregation parameters include system id, system priority and system key. The aggregation parameters further include node id and node priority.

The method further includes: if an intra-portal link between two nodes in the DLAG has failed, selecting the node with a lower node priority from the two nodes, and modifying the aggregation parameters of the selected node.

The LIC unit runs link aggregation group internal coordinator protocol (LICP). In the above, a protocol used by the LICP is based on link layer discovery protocol (LLDP) or link aggregation control protocol (LACP).

The one or multiple nodes are located in the same network and are connected to one or multiple nodes of another network.

The DLAG is a distributed resilient network interconnection interface which is used for transmitting traffic inside the network to the external of the network, or transmitting traffic outside the network to the internal of the network and implementing protection to the traffic between interconnection networks on links and nodes.

According to another embodiment of the disclosure, a method for implementing resilient network interconnection is provided, including: implementing a distributed resilient network interconnection through a link aggregation group (LAG); and containing one or multiple systems at endpoints at two ends of the LAG.

The endpoint includes LAG of at least two systems, the system includes: containing one internal coordinator (LIC) unit on each of the one or multiple systems, wherein the LIC unit is used for exchange of parameters and coordination of information among multiple nodes, and the LIC unit ensuring that the one or multiple aggregation ports on the one or multiple nodes can work as one LAG.

The LIC unit implementing the exchange of parameters and the coordination of information among the multiple systems includes: exchanging aggregation parameters among the multiple systems through the LIC unit; and exchanging aggregation port information among the multiple systems through the LIC unit.

The LIC unit ensuring that the multiple aggregation ports on the one or multiple nodes can work as one LAG includes: under the coordination of the LIC unit, the one or multiple nodes obtaining consistent aggregation parameters.

The LIC unit ensuring that the multiple aggregation ports on the one or multiple nodes can work as one LAG includes: one or multiple nodes which have the consistent aggregation parameters working as one logic node, connecting the one or multiple nodes which have the consistent aggregation parameters by using one or more links for interaction and negotiation of the LIC unit as one or more intra-portal links.

The LIC unit ensuring that the multiple aggregation ports on the one or multiple nodes can work as one LAG includes: exchanging aggregation port information among the one or multiple nodes under the coordination of the LIC unit; and adding one or multiple aggregation ports of the one or multiple nodes into the LAG.

The endpoint includes LAG of at least two systems, the system includes: creating one or more corresponding virtual aggregator multiplexers and one or more corresponding virtual aggregator parsers on the one or more nodes.

Creating one or more corresponding virtual aggregator multiplexers and one or more corresponding virtual aggregator parsers on the one or more nodes includes: a node receiving the aggregation port information of other nodes, creating one or more virtual aggregator multiplexers corresponding to one or more aggregation links on the other nodes according to the aggregation port information, and creating one or more virtual aggregator parsers corresponding to the other nodes.

The endpoint includes LAG of at least two systems, the system includes: a service gateway unit, configured to determine traffic inside the LAG and ensure that traffic which belongs to the same session flows into or flows out from the same gateway.

The gateway belongs to one of the one or multiple systems, by which system the traffic of the session flowing out from a terminal network or flowing into the terminal network needs to be forwarded.

The service gateway unit further performs the following processing: when the service gateway unit receives a frame from a frame collector, determining which service gateway the frame should pass into or out of; if the service gateway which the frame should pass into or out of is the system where the service gateway unit is located, the service gateway unit sending the frame into a MAC relay for forwarding the frame to the internal of the network of the node; and if the service gateway which the frame should pass into or out of is not the system where the service gateway unit is located, the service gateway unit sending the frame to the system where the service gateway which the frame should pass into or out of is located via an intra-portal link.

The service gateway further performs the following processing: when the service gateway unit receives a frame sent from a relay and then forwarded by a system, according to an aggregation link selected by traffic assignment, sending the frame to an aggregation link of the current system, or sending the frame to an aggregation links of other systems at the current end via an intra-portal link.

Information of frame-to-gateway assignment and/or frame-to-aggregation port is exchanged among multiple nodes through the LIC unit.

The service to which the frame belongs is represented using a virtual local area network identifier (VLAN-ID) or represented using a backbone service instance identifier (I-SID).

The method further includes: when an aggregation port in a node is removed, notifying other nodes, which are connected with the node via an intra-portal link, of information regarding an aggregation port is removed; the other systems deleting the virtual aggregator multiplexer corresponding to the removed aggregation port; and once a group of virtual aggregator multiplexers, which correspond to the node where the removed aggregation port is located, on the other systems are all removed, the other systems deleting the virtual aggregator parser corresponding to the node where the removed aggregation port is located.

Aggregating one or multiple aggregation ports on multiple systems into one LAG includes: exchanging aggregation parameters through LIC units among the multiple systems and performing negotiation, and when consistent aggregation parameters are get, aggregating one or multiple aggregation ports on the multiple systems into one LAG.

The aggregation parameters include system id, system priority and system key.

The aggregation parameters further include node id and node priority.

The method further includes: if an intra-portal link between two nodes in the DLAG has failed, selecting the system which has a lower node priority from the two systems, and modifying the aggregation parameters of the selected system.

The LIC unit runs link aggregation group internal coordinator protocol (LICP).

A protocol used by the LICP is based on link layer discovery protocol (LLDP) or link aggregation control protocol (LACP).

The one or multiple systems are located in the same network and are connected to one or multiple systems of another network.

The LAG is distributed resilient network interconnection which is used for transmitting traffic inside the network to the external of the network, or transmitting traffic outside the network to the internal of the network and implementing protection to the traffic between interconnection networks on links and nodes.

According to another embodiment of the disclosure, a system for implementing a resilient network interface is provided, the system includes: an aggregation module, configured to aggregate one or multiple aggregation ports on one or multiple nodes into one distributed link aggregation group (DLAG); and a resilient interface implementation module, configured to implementing a distributed resilient network interface by the DLAG aggregated by the aggregation module.

The aggregation module includes: an LIC unit configuration sub-module, configured to contain one link internal coordinator (LIC) unit on each of the one or multiple nodes, wherein the LIC unit is used for implementing exchange of parameters and coordination of information among the multiple nodes; and an aggregation sub-module, configured to ensure, by the LIC unit, that the multiple aggregation ports on the one or multiple nodes can work as one DLAG.

The aggregation module includes: an aggregation creation sub-module, configured to create one or more corresponding virtual aggregator multiplexers and one or more corresponding virtual aggregator parsers on the one or more nodes.

The aggregation module includes: a service gateway unit configuration sub-module, configured to contain a service gateway unit, which is used for determining which gateway the traffic of the DLAG should pass into or out of, on each of the one or more nodes.

The resilient interface implementation module includes: a gateway determination sub-module, configured to, when the service gateway unit receives a frame from a frame collector, determine which service gateway the frame should pass into or out of; and a frame forwarding sub-module, configured to, if the gateway determination sub-module determines that the service gateway which the frame should pass into or out of is the node where the service gateway unit is located, send the frame to the internal of the network of the node where the service gateway unit is located using the service gateway unit via a MAC relay; and if the service gateway which the frame should pass into or out of is not the node where the service gateway unit is located, send the frame to the node where the service gateway which the frame should pass into or out of using the service gateway unit via an intra-portal link.

The system further includes: a deletion information notification module, configured to, when an aggregation port in a nodes of the DLAG is removed, notify other nodes, which are connected with the node via an intra-portal link, of information regarding an aggregation port is removed; and a deletion response module, configured to, when the other nodes receive the information notification regarding the deletion, delete the virtual aggregator multiplexer corresponding to the removed aggregation port; and once a group of virtual aggregator multiplexers, which correspond to the node where the removed aggregation port is located, on the other nodes are all removed, delete the virtual aggregator parser corresponding to the node where the removed aggregation port is located.

The aggregation sub-module includes: an aggregation sub-unit, configured to, exchange aggregation parameters through LIC units among the multiple nodes and perform negotiation, and when consistent aggregation parameters are get, aggregate one or multiple aggregation ports on the multiple nodes into one DLAG.

The system further includes: an aggregation parameter updating module, configured to, if an intra-portal link between two nodes in the DLAG has failed, select the node with a lower node priority from the two nodes, and modify the aggregation parameters of the selected node.

The one or multiple nodes are located in the same network and are connected to one or multiple nodes of another network.

The DLAG is a distributed resilient network interconnection interface which is used for transmitting traffic inside the network to the external of the network, or transmitting traffic outside the network to the internal of the network and implementing protection to the traffic between interconnection networks on links and nodes.

In the disclosure, by way of aggregating one or multiple aggregation ports on one or multiple nodes into one DLAG and implementing a resilient network interface by the DLAG, the problem that the existing loop network protection technology cannot ensure the normal transmission of traffic in an arbitrary network is solved, which effectively ensures the normal operation of services in the network and improve the reliability of the network interface and the utilization rate of the link.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Based on the LACP (Link Aggregation Control Protocol) technology specified in 802.1AX-2008 standards, the embodiments of the disclosure provide a method and system for implementing resilient network interface (or referred to as resilient network interconnection). The embodiments of the disclosure implement a resilient network interface in a flexible manner, especially the interconnection protection among Ethernets. The aggregation port in the embodiments of the disclosure may also refer to an aggregation link connecting one node to another node.

Embodiment 1

Figure 1:
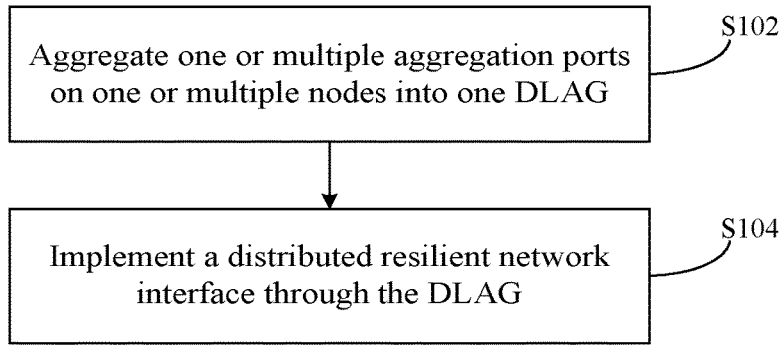
FIG. 1 is a flowchart of a method for implementing a resilient network interface according to embodiment 1 of the disclosure.

This embodiment provides a method for implementing protection of a resilient network interface, and with reference to FIG. 1, the method includes the following steps.

Step S102, one or multiple aggregation ports on one or multiple nodes are aggregated into one DLAG.

Here, the one or multiple nodes are located in the same network and connected to one or multiple nodes of another network. They can also be located in different networks or located inside one network. The DLAG in this embodiment can also be implemented in the form of LAG.

When the one or multiple nodes are located in the same network and connected to one or multiple nodes of another network, the aggregated DLAG is preferably a distributed resilient network interconnection interface which is used for transmitting the traffic inside the network to the external of the network, or transmitting the traffic outside the network to the internal of the network, and implementing the protection to the traffic between the internal and external of the network.

For example, an LIC (LAG Internal Coordinator Protocol) unit is contained on each node, wherein the LIC unit is used for the exchange of parameters and the coordination of information among the nodes; and the LIC unit ensures that one or multiple aggregation ports on multiple nodes can work as one DLAG. The LIC unit being used for the exchange of parameters and the coordination of information among the nodes includes: exchanging aggregation parameters among the nodes through the LIC unit; and exchanging aggregation port information among the nodes through the LIC unit. The aggregation parameters include system id, system priority and system key and so on, or further include node parameters, and the node parameters include: node id, node priority and so on.

The LIC unit ensuring that multiple aggregation ports on the one or multiple nodes can work as one DLAG may further include: under the coordination of the LIC unit, the one or multiple nodes obtaining consistent aggregation parameters; and under the coordination of the LIC unit, the nodes exchanging the aggregation port information, and adding multiple aggregation ports thereof to the DLAG. Preferably, the aggregation parameters are exchanged through the LIC units among the multiple nodes and negotiation is performed, and when consistent aggregation parameters are get, one or multiple aggregation ports on the multiple nodes are aggregated into one DLAG. In this embodiment, one or multiple nodes which have consistent aggregation parameters may work as one logic node, the nodes which have consistent aggregation parameters are connected by using the link for the interaction and negotiation of the LIC unit serves as an intra-portal link. These nodes which have consistent aggregation parameters form a logic node through the connection of one or multiple intra-portal links, and the intra-portal links can not only be used for information interaction of the LIC unit but can also be used for the transmission of traffic among multiple nodes in the logic node.

Preferably, aggregating the multiple aggregation ports on the one or multiple nodes into one DLAG includes: creating one or multiple corresponding virtual aggregator multiplexer and one or multiple corresponding virtual aggregator parser on the one or multiple nodes. For example, after receiving the aggregation port information of other nodes, a node creates one or multiple virtual aggregator multiplexer corresponding to the aggregation links on the other nodes according to the aggregation port information, and creates one or multiple virtual aggregator parser corresponding to the other nodes, wherein the number of the virtual aggregator multiplexers and the number of aggregation ports in the aggregation port information sent by the other nodes are consistent, and one node correspond to one virtual aggregator parser. That is, the virtual aggregator multiplexers correspond to the aggregation links on the nodes, and the virtual aggregator parsers correspond to the nodes.

Step S104, a distributed resilient network interface is implemented by the DLAG. The resilient network interface refers to that the network interface can protect the traffic thereon, and the distributed resilient network interface no longer performs protection on one point, instead, it allows to perform protection among multiple points which belong to the network interface, here, traffic protection is distributed among the points.

When implementing the aggregation of multiple aggregation ports on one or multiple nodes into one DLAG, this embodiment may also contain on each of the one or multiple nodes a service gateway unit for determining which gateway the traffic of the DLAG should pass into or out of, and this gateway is a specific node by which the traffic flowing from one terminal network or flowing into the terminal network needs to be forwarded. Based on this, implementing a resilient network interface through this DLAG includes:

1) when the service gateway unit receives a frame from a frame collector, the service gateway unit determines the service gateway which the frame should pass into or out of;
2) if the service gateway which the frame should pass into or out of is the node where the service gateway unit is located, the service gateway unit sends the frame into a MAC relay for forwarding the frame to the internal of the network of the node (that is, the node where the service gateway unit is located);
3) if the service gateway which the frame should pass into or out of is not the node where the service gateway unit is located, the service gateway unit sends the frame to the node where the service gateway which the frame should pass into or out of is located via an intra-portal interface. Here, the intra-portal interface is connected with an intra-portal link, and the selected intra-portal interface here is an intra-portal interface corresponding to the intra-portal link between the node and the service gateway which the frame should pass into or out of.

Various nodes in a logic node are connected through the intra-portal links, and here, the intra-portal links can be physical links and can also be logic links, for example, the intra-portal links can be direct physical links and can also be logic tunnels established over the network where these nodes are located.

In order to better implement the above-mentioned resilient network interface, this embodiment may also include: exchanging information of frame-to-gateway assignment and/or frame-to-aggregation port among multiple nodes through the LIC unit.

When an aggregation port in a node of the DLAG is removed, the method also includes: notifying other nodes, which are connected with the node via intra-portal links, of information regarding an aggregation port is removed; the other nodes deleting the virtual aggregator multiplexer corresponding to the removed aggregation port; and once a group of virtual aggregator multiplexers, which correspond to the node where the removed aggregation port is located, on the other nodes are all removed, the other nodes deleting the virtual aggregator parser corresponding to the node where the removed aggregation port is located.

If the intra-portal link between two nodes in the DLAG has failed, the node with a lower node priority is selected from the two nodes, and the aggregation parameters of the selected node are modified.

The LIC unit in this embodiment runs LAG Internal Coordinator Protocol (LICP). The protocol employed by the LICP can be based on Link layer Discovery Protocol (LLDP) or LACP, and can also be a newly defined protocol.

In the above-mentioned method, by way of aggregating one or multiple aggregation ports on one or multiple nodes into one DLAG and implementing a resilient network interface by the DLAG, the problem that the existing loop network protection technology cannot ensure the normal transmission of traffic in an arbitrary network is solved, which effectively ensures the normal operation of services in the network and improve the reliability of the network interface and the utilization rate of the link.

The above-mentioned method is suitable for the interconnection protection among Ethernets. For the sake of description, one of the above-mentioned nodes is referred to as an edge node, and the other one is referred to as an adjacent node, wherein the edge node and the adjacent node are located in the same network and are connected to the other network. Of course, there can be more than one adjacent node connected to this edge node via an intra-portal link. The intra-portal link in this embodiment refers to the link between two edge nodes in the same network, and the edge node and the adjacent node exchange their aggregation parameters via the intra-portal link.

When the edge node determines that the aggregation parameters thereof are the same as those of the above-mentioned adjacent node, this edge node establishes a DLAG with the adjacent node. DLAG includes an LAG to which the edge node and the adjacent node belong, wherein the LAG to which the edge node and the adjacent node belong is the same as the aggregation group in the related art, for example, edge node A belongs to a first network, edge node B belongs to a second network, and edge node A and edge node B are connected via multiple links, then the multiple links between edge node A and edge node B are one LAG.

In this embodiment, the edge node and the adjacent node can employ LICP to perform information interaction, for example, exchanging the aggregation parameters, over the intra-portal link, wherein the aggregation parameters include system id, system priority and system key and so on; or the aggregation parameters include node parameters, and the node parameters include node id, node priority and so on.

The above-mentioned LICP can be based on LLDP or LACP. For example, it may be implemented by expanding the TLV field of the LLDP or LACP for carrying required information. That the LICP is based on LACP is preferred in this embodiment. When the LICP is based on the LACP, the LACP over the network interconnection interface is referred to as external LACP, and the LICP over the intra-portal interface is referred to as internal LACP.

In this embodiment, the edge node and the adjacent node establish a DLAG on the basis of LAG, and the procedure includes: the edge node acquiring the port aggregation information about the adjacent node; the edge node creating a group of virtual aggregator multiplexers and virtual aggregator parsers in the aggregator thereof according to the acquired port aggregation information of the adjacent node; creating a control multiplexer and parser for the group of virtual aggregator multiplexers and virtual aggregator parsers; and providing a service gateway unit in the edge node, which service gateway unit is connected to the MAC (Media Access Control) client layer, frame collector and frame distributor in the edge node. Of course, the above-mentioned created virtual aggregator multiplexers and virtual aggregator parsers may not be crated in the original aggregator of the node.

This group of virtual aggregator multiplexers and virtual aggregator parsers has n virtual aggregator multiplexers and 1 virtual aggregator parser, wherein n is equal to the number of aggregation links on the adjacent node, and a group of virtual aggregator multiplexers and virtual aggregator parsers corresponds to an adjacent node, if there are m adjacent nodes, the m adjacent nodes correspond to m groups of virtual aggregator multiplexers and virtual aggregator parsers. The control multiplexer and parser can also be represented as "control multiplexer/parser".

After the above-mentioned DLAG aggregation is completed, the edge node protects the traffic on the interconnection interface using the link inside the DLAG.

Figure 2:
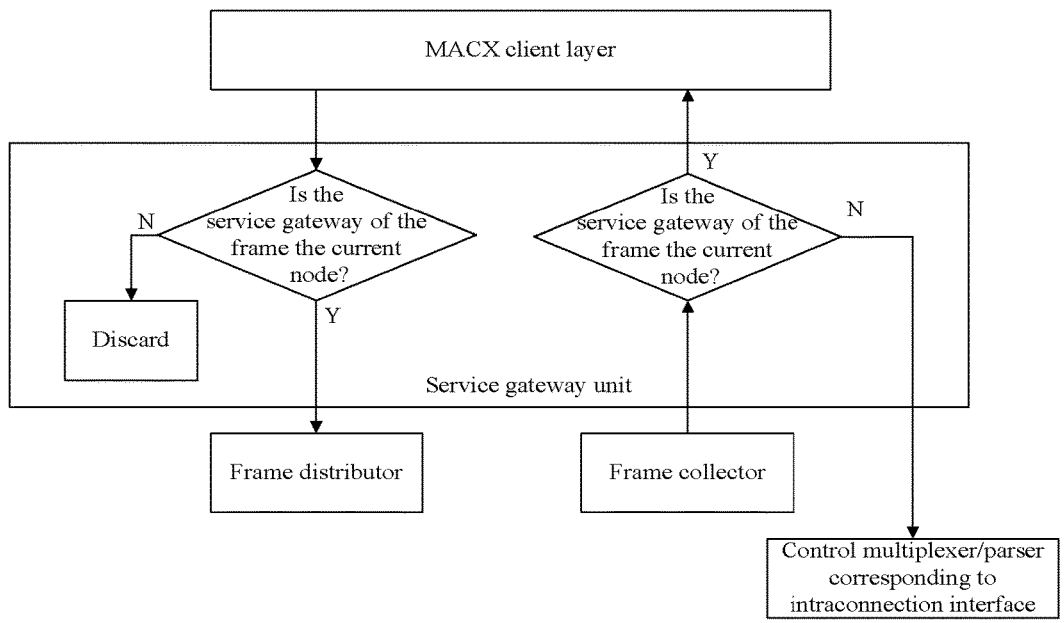
FIG. 2 is a schematic diagram of the internal processing logic of a service gateway unit according to embodiment 1 of the disclosure.

The traffic protection in this embodiment not only includes traffic balancing processing but also includes traffic switching processing during link faults. Based on the above-mentioned established DLAG, the edge node protecting the traffic on the interconnection interface using the link inside the DLAG includes frames in two directions, the frame in one direction is received by the service gateway unit and sent from the frame collector, and the frame of the other direction is received by the service gateway and to be sent to the frame distributor. The processing schematic diagrams of these two frames can be as shown in FIG. 2, and for the first kind of frame, the service gateway unit performs the following processing:

1) when the service gateway unit receives a frame from a frame collector, determining the gateway corresponding to the service to which the frame belongs;
2) if the gateway corresponding to the service to which the frame belongs is the above-mentioned edge node, then the gateway corresponding to the service to which the frame belongs is provided with the node where the aggregator of the service gateway unit is located, and the service gateway unit sends the frame to the inside of the network where the edge node is located via an MAC relay;
3) if the gateway corresponding to the service to which the frame belongs is the above-mentioned adjacent node, that is, the gateway corresponding to the service to which the frame belongs is not provided with the node where the aggregator of the service gateway unit is located, the service gateway unit sends the frame to the control multiplexer and parser, and the control multiplexer and parser forwards the frame to the adjacent node via an intra-portal interface. Here, the intra-portal interface is used for connecting an intra-portal link, and the selected intra-portal interface here is an intra-portal interface corresponding to the intra-portal link between the node and the service gateway which the frame should pass into or out of.

For the second kind of frame, the service gateway unit needs to perform the following processing:

1) for a frame to be sent to the frame collector, the service gateway unit determines the gateway corresponding to the service to which the frame belongs;
2) if the gateway corresponding to the service to which the frame belongs is the above-mentioned edge node, that is, the gateway corresponding to the service to which the frame belongs is the node where the aggregator provided with the service gateway unit is located, the service gateway unit sends the frame into the frame distributor, and the frame distributor executes a distribution algorithm to determine the network interconnection interface corresponding to the frame, and sends the frame via the determined network interconnection interface;
3) if the gateway corresponding to the service to which the frame belongs is not the above-mentioned edge node, that is, the gateway corresponding to the service to which the frame belongs is not the node where the aggregator provided with the service gateway unit is located, then the frame will be discarded.

For the second kind of frame, if the network where the node is located can ensure that the traffic which will flow from the network can directly arrive at the corresponding service gateway node, then this processing can be omitted.

The service to which the above-mentioned frame belongs can be represented using a virtual local area network (VLAN) identifier, and the virtual local area network identifier can be represented with VLAN-ID or VID, and the service to which the above-mentioned frame belongs can also be represented with a backbone service instance identifier (I-SID), and according to the difference of network types, the service identifier thereof can be different, which is described here only by way of example but not limited.

When there is a link in a second LAG is removed (that is, there is a link removed in the LAG to which the adjacent node belongs), the adjacent node notifies the edge node of the identifier information about the removed link; and the edge node deletes the virtual aggregator multiplexer corresponding to the removed link; and when the number of a group of virtual aggregator multiplexers corresponding to a certain node is 0, then the edge node deletes the virtual aggregator parser receiver corresponding to this node.

In this embodiment, the number of adjacent nodes can be one or more; when a certain intra-portal link among the nodes of a logic node has failed, since the nodes which belong to one DLAG originally cannot perform negotiation through LICP to exchange information, these nodes cannot be aggregated into one DLAG, that is, they cannot form a logic node via intra-portal links, and at this moment, one node with a low node priority can be selected therefrom to change the aggregation parameters thereof (parameters such as system id, system priority, etc.) and removed from this DLAG. Based on this, the method also includes: when discovering that the intra-portal link between the edge node and the adjacent node has failed, a superior network device selecting a node with a lower node priority from the edge node and the adjacent node, modifying the aggregation parameters of the selected node, and removing the selected node from the logic node; and the superior network device using other nodes in the DLAG as the service gateway of the selected node, that is, all the services as service gateways on the originally removed node will also be allocated to other nodes which still belong to this DLAG and these other nodes will be used as the service gateways of the originally removed node.

Figure 3:
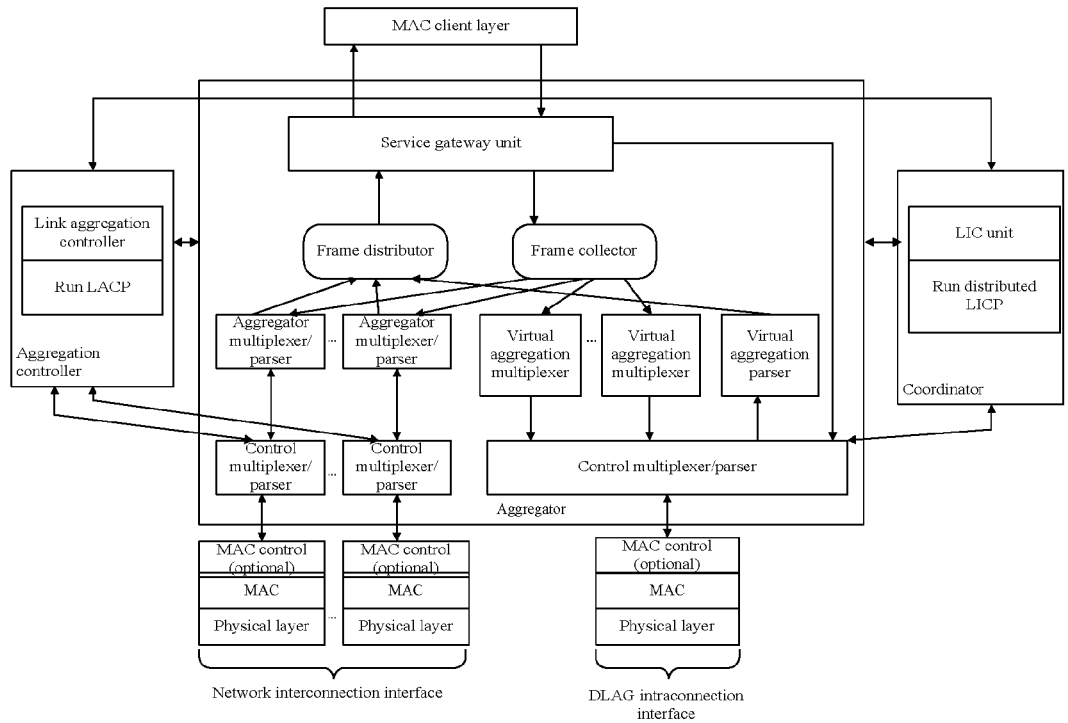
FIG. 3 is an exploded schematic diagram of the system architecture and functional modules of a distributed LAG according to embodiment 1 of the disclosure.

In order to enable the edge node to perform information interaction with the adjacent node via the intra-portal link, an LAG internal coordinator unit (that is, LIC unit) can be added to the coordinator inside the original edge node, which LIC units runs Distributed LAG Internal Coordinate Protocol (LICP), and referring to the schematic diagram of the system architecture and functional modules of the distributed LAG shown in FIG. 3, the aggregator is newly added with the above-mentioned service gateway unit, a group of virtual aggregator multiplexers and virtual aggregator parsers and a control multiplexer and parser on the basis of the original LAG, wherein a group of virtual aggregator multiplexers and virtual aggregator parsers corresponds to a control multiplexer and parser. In addition to that, the aggregator also includes the original frame collector and frame distributor and an aggregation parser/multiplexer (Aggregation P/M) and control parser/multiplexer (Control P/M) corresponding to the aggregation port of this node. The virtual aggregator multiplexers and virtual aggregator parsers correspond to other adjacent nodes in the same logic node.

It can be known from the above-mentioned content that the virtual aggregator multiplexers and virtual aggregator parsers in this embodiment are used for participating in the traffic assignment of this DLAG. The traffic which will be transmitted by the aggregation links on the other nodes in the DLAG group can be transmitted to other nodes via intra-portal links, and the traffic sent from the aggregation links on the other nodes can be received.

The creation of virtual aggregator multiplexer and virtual aggregator parser is controlled by the LIC unit. For example, the LIC unit controls the number of virtual aggregator multiplexers to be created to be consistent with the number of aggregation ports sent from the peer node. The peer node is the node which will be connected to the node of the created virtual aggregator multiplexer/parser sender via an intra-portal interface, that is, the above-mentioned adjacent node.

A group of virtual aggregator multiplexers and virtual aggregator parsers corresponds to a control multiplexer/parser, and the control multiplexer/parser is created under the control of the LIC unit. Each intra-portal interface corresponds to a control multiplexer/parser. The control multiplexer/parser is used for distinguishing the traffic received from the intra-portal link, determining it is data traffic or control signaling, sending same to the frame collector if it is data traffic, and sending same to the LIC unit if it is control signaling (here it is the control protocol frame of LICP).

Here, the virtual aggregator multiplexer and the virtual aggregator parser are both connected to the intra-portal interface where this node is connected to the node in the same DLAG group.

Figure 4:
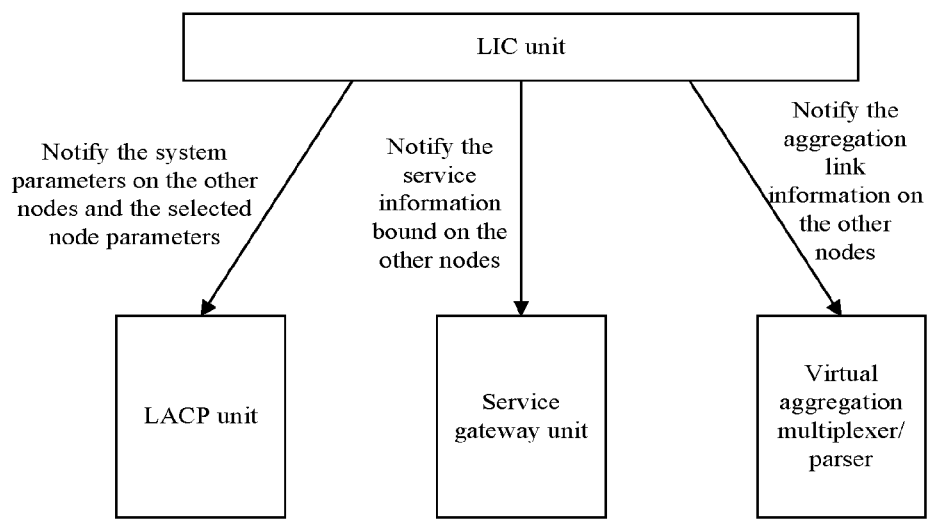
FIG. 4 is a schematic diagram of the information interaction between an LIC unit and other units according to embodiment 1 of the disclosure.

Referring to the schematic diagram of information interaction between the LIC unit and other modules shown in FIG. 4, the LIC unit is used for the exchange of parameters and the coordination of information among the nodes which belong to the same DLAG. It includes but not limited to the following functions:

1) each node notifies the adjacent node of the aggregation parameters and node parameters and so on thereof through the LIC unit. The aggregation parameters and node parameters can employ the same format, and the adjacent nodes which have the same aggregation parameters are possible to form one DLAG, that is, they can be aggregated.

2) the LIC unit runs on the intra-portal link of each node, and the aggregation port information of each node of the same DLAG are transmitted among the nodes which belong to the same DLAG through the LIC unit. For example, each node in the DLAG acquires the port aggregation information about other adjacent nodes in the group, and then creates a group of corresponding virtual aggregator multiplexers and virtual aggregator parsers inside the aggregator thereof according to the aggregation information sent from each adjacent node. For a certain adjacent node, one virtual aggregator multiplexer/parser receiver and n virtual aggregator multiplexer/parser senders are created, wherein n is the number of aggregation links on the adjacent node.

If there is a link on the adjacent node inside the same LAG is removed from the original aggregation group LAG, then the LIC unit also needs to notify the peer end of same, and the LIC unit of the peer node will also delete the corresponding virtual aggregator multiplexer/parser sender, and if there is no more virtual aggregator multiplexer/parser sender in the group, the virtual aggregator multiplexer/parser sender will also be removed.

3) information of frame-to-gateway assignment and/or frame-to-aggregation port are exchanged among multiple nodes inside the DLAG for controlling the direction of the traffic, which can particularly refer to the processing procedure of the above-mentioned service gateway unit.

In this embodiment, by way of establishing a DLAG among the edge nodes of interconnected networks and performing traffic protection on interconnection interfaces in the DLAG, the problem that the existing ring network protection technologies cannot ensure the traffic among arbitrary interconnection networks is solved, thereby effectively ensuring the normal operation of services when networks are interconnected, improving the reliability of the network interconnection interface and the utilization rate of the link.

Hereinafter, taking an interconnection network as an example, the distributed LAG architecture and the method provided in the above-mentioned embodiment 1 will be described in conjunction with particular implementations and drawings. Since the implementation inside the network is relatively simple, it will not be described in detail here.

Example 1

Figure 5:
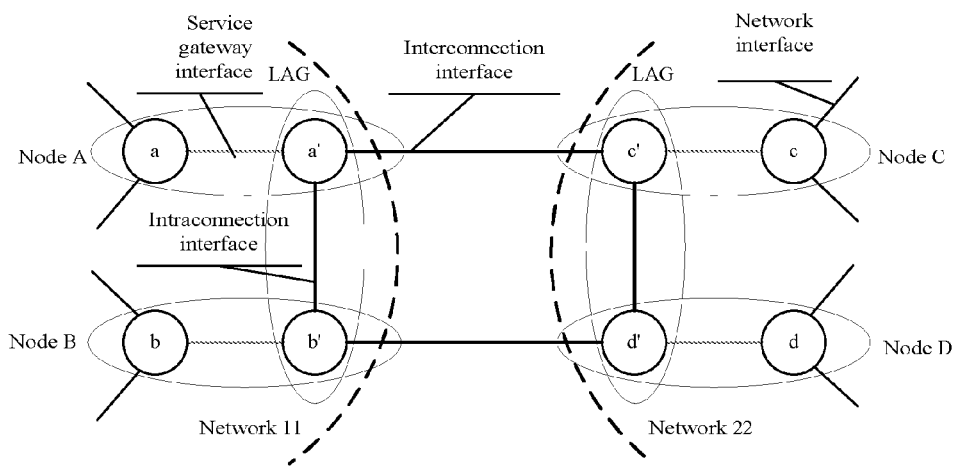
FIG. 5 is a network connection topology diagram according to example 1 of the disclosure.
Figure 6:
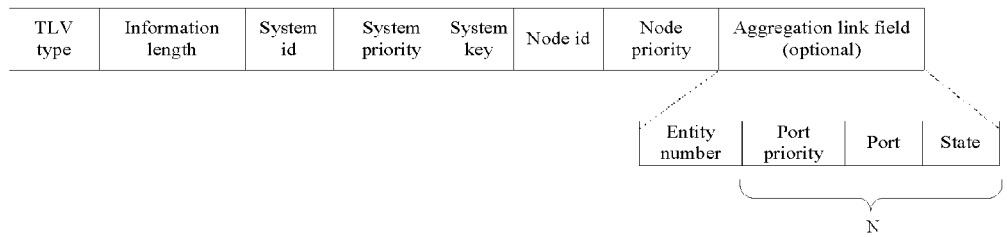
FIG. 6 is a schematic diagram of TLV format I of LICP for exchanging aggregation information according to example 1 of the disclosure.
Figure 7:
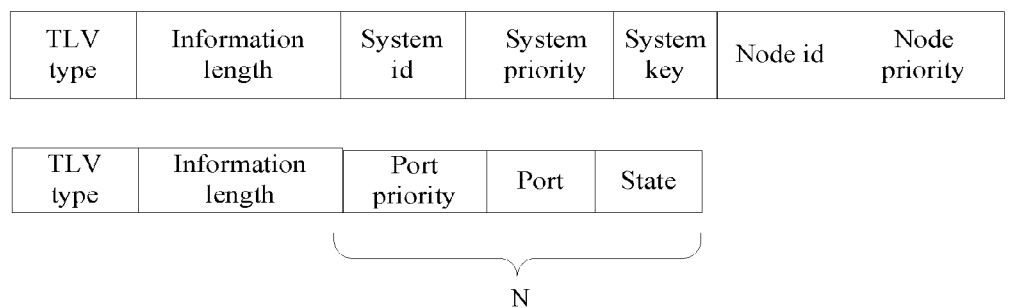
FIG. 7 is a schematic diagram of TLV format II of LICP for exchanging aggregation information according to example 1 of the disclosure.

FIG. 5 is a topology diagram of a network connection implemented according to the disclosure, and as shown in FIG. 5, nodes A and B both have their own node ids, which are 001 and 002 respectively and also have their own node priorities, which are 0 and 1 respectively. Likewise, nodes C and D both have their own node ids, which are 003 and 004 respectively, and also have their own node priorities, which are 0 and 1 respectively. It is expected that a' of node A and b' of node B can form a distributed link aggregation group (DLAG) through LICP and LACP; and c' of node C and d' of node D can also form a distributed link aggregation group (DLAG). From a macroscopic view, although the link between A and C and the link between B and D are on different nodes, they work in the same aggregation group, and the traffic can be transmitted through this aggregation group, so as to realize traffic protection and load sharing.

b' and a' notify their own system information (that is, the system parameters in the above-mentioned embodiment) through LICP protocol, information such as system id, system priority, key, etc., and the format can be as shown in FIGS. 6 and 7, the following fields are included: TLV type, information length, system id, system priority, system key, node id, node priority, aggregation link field (optional), wherein the aggregation link field includes entity number, port priority, port and state; only if they have the same value, these nodes can form a DLAG.

Figure 8:
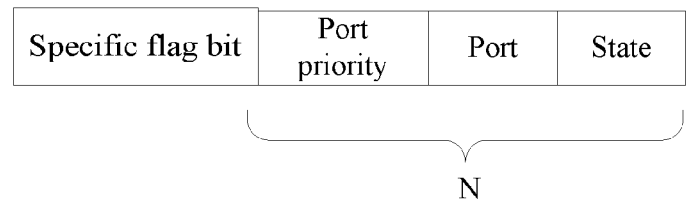
FIG. 8 is a schematic diagram of the format of the LICP in which the TLV aggregation link field carries a specific identifier for exchanging aggregation information according to example 1 of the disclosure.
Figure 9:
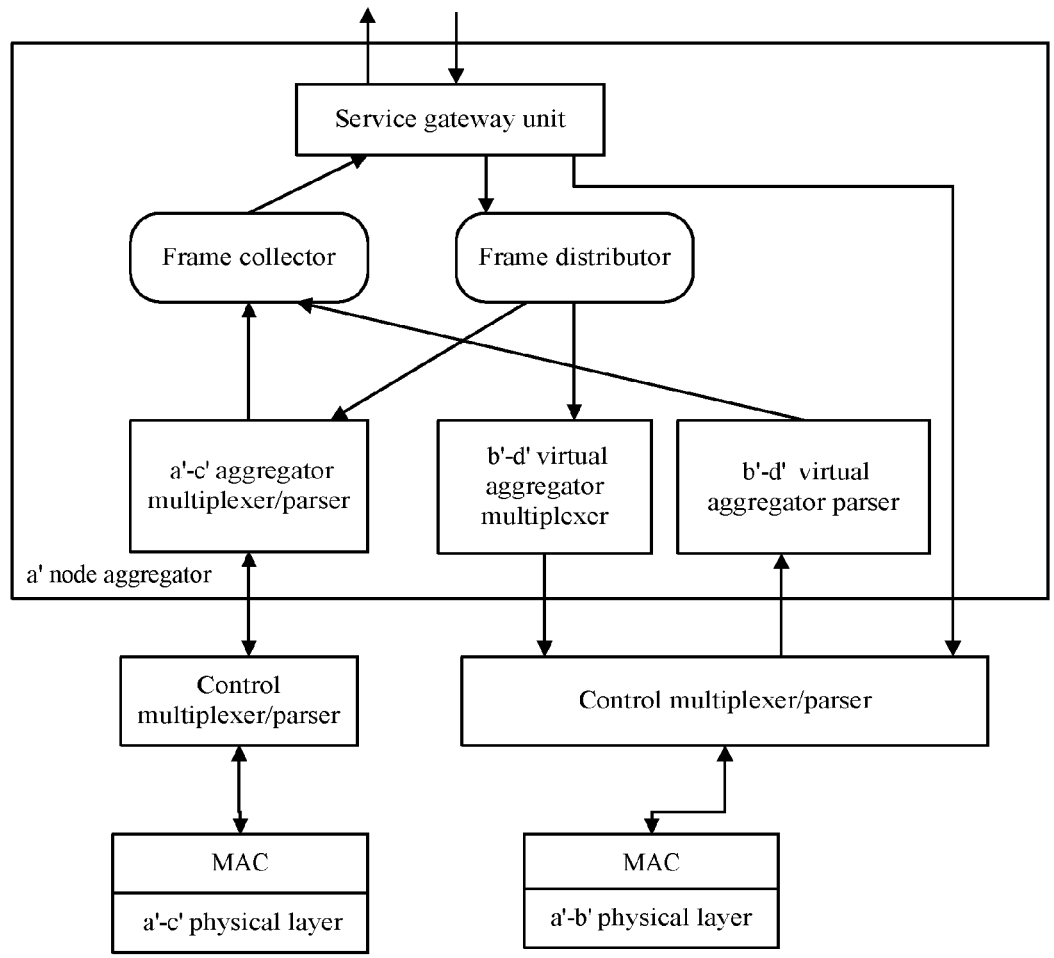
FIG. 9 is a structural schematic diagram of the internal logic of the aggregator of node a' after the LICP completes interaction according to example 1 of the disclosure.

Therefore, b' notifies its own aggregation information to a' through LICP protocol, and likewise, a' also notifies its own aggregation information to b' through LICP protocol. Here, usually this information can be carried through TLV, the TLV format in this embodiment can be as shown in FIG. 8, and the aggregation informations are placed in the aggregation link field. When there is still no aggregation link in the system of this node, this field may not be carried. In another manner, this field can be carried as one TLV independently, that is, the TLV shown in FIG. 8 is divided into two TLVs, as shown in FIG. 7.

a' receives the link information sent from b' about the aggregation of b' and d', and therefore, a virtual aggregator multiplexer/parser receiver b'-d' and a virtual aggregator multiplexer/parser sender b'-d' will be created in the aggregator of a'. Thus, there will be two aggregation multiplexers/parsers in the aggregator of node a, and as shown in FIG. 9, when node a sends traffic to the network interconnection port, the traffic is actually sent by the following aggregator:

when sending traffic, the aggregator will select these two aggregator multiplexers/parsers, if the aggregator multiplexer/parser of node a itself is selected, then the traffic runs along link a'-c'; and if the aggregator multiplexer/parser created for link b'-d' in this aggregator is selected, then the traffic will be sent out from port a'-b' and transmitted by b' over link b'-d'.

When one of the links has failed, such as link b'-d' has failed, then b' will send an LICP to notify a' via intra-portal link b'-a'. Here, there are various notification methods, one is that b' sends to a' an LICP protocol which has an aggregation link field with a specific flag bit (as shown in FIGS. 6 and 7), here the specific flag bit (action) can be placed in the aggregation link field, and when action=1, it indicates that this link needs to be removed; and when action=0, it indicates that this link needs to be added into the aggregator, as shown in FIG. 8. Therefore, a' will delete link b'-d' from the corresponding aggregator multiplexer/parser sender b'-d' in aggregator a', and at this moment, only aggregator multiplexer/parser a'-c' is in the aggregator of a', and therefore, all the traffic will be forwarded from link a'-c'. Moreover, since there is no redundant virtual aggregator multiplexer/parser senders in the aggregator of a', the virtual aggregator multiplexer/parser receiver will also be removed. Thus, the protection to b'-d' by a'-c' is realized.

a' and b' also need to intercommunicate information of frame-to-gateway assignment and/or frame-to-aggregation port between these two nodes. It is assumed that the gateway is node A if the VID of the traffic is in the range of 1-2000, and the gateway is node B if the VID of the traffic is in the ranger of 2001-4095. When the traffic with VID=100 incomes from the network interconnection interface of node A, this traffic will be directly sent from node A to network 11; and if the traffic of this service incomes from the network interconnection interface of node B, this traffic will be sent to the interconnection interface between a' and b' by the gateway selection module of b', thus node A receives this traffic and then forwards same to network 11.

In addition, here, a' and b' can form an aggregation group only via the intra-portal link, and at this moment, and their aggregation parameters are systems parameters transmitted through LICP (such as system id, system priority). However, once the intra-portal link has failed, that is, a' and b' cannot be aggregated into an aggregation group, there can be the following two choices:

1) a' and b' takes their own node ids and node priorities as the system ids and system priorities for aggregation to aggregate again with c' and d' of the peer network.

2) since the node priority of a' is higher than that of b', a' will remain the original aggregation parameters thereof and continue to retain the aggregation with c'. While b' will modify some system parameters thereof, such as system id, system priority and so on, thus this node no longer belongs to this DLAG.

Service 2001-4095 which are used as gateways by b' originally will be allocated to a', that is, in this DLAG, a' is the gateway of all services.

Example 2

Figure 10:
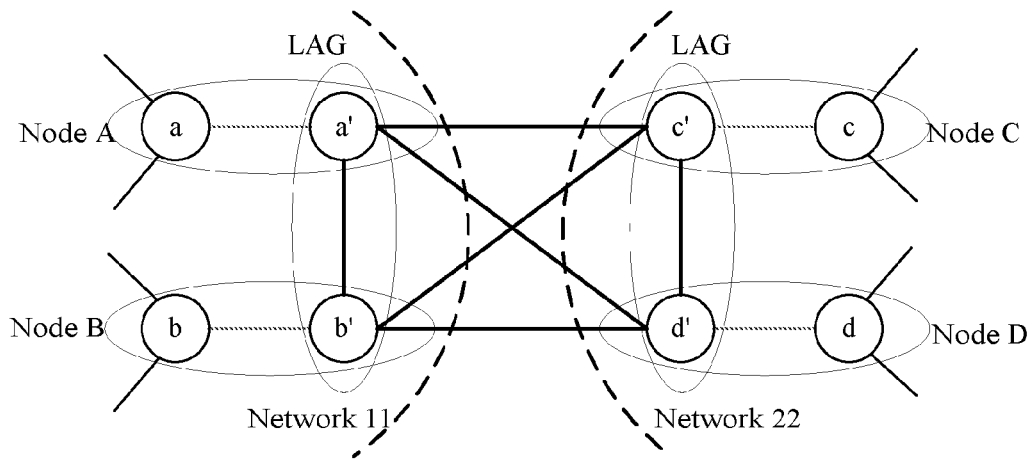
FIG. 10 is a network connection topology diagram according to example 2 of the disclosure.

With reference to the network connection topology diagram shown in FIG. 10, the network at each side has two edge nodes, and network 11 is connected to nodes C and D of network 22 via nodes A and B. There is a full connection among nodes A, B, C and D, that is, A is connected to C and D, B is also connected to C and D, when a' and b' are viewed as a DLAG and c' and d' are viewed as a DLAG, there are four aggregation links in this DLAG, and traffic protection and load sharing are realized through these aggregation links.

The aggregation process in this example is similar to example 1, b' and a' notify their own system information through LICP protocol, information such as system id, system priority, key and so on, the formats can be as shown in FIGS. 6, 7 and 9, and only when these values are the same, these nodes can be aggregated into a DLAG.

Figure 11:
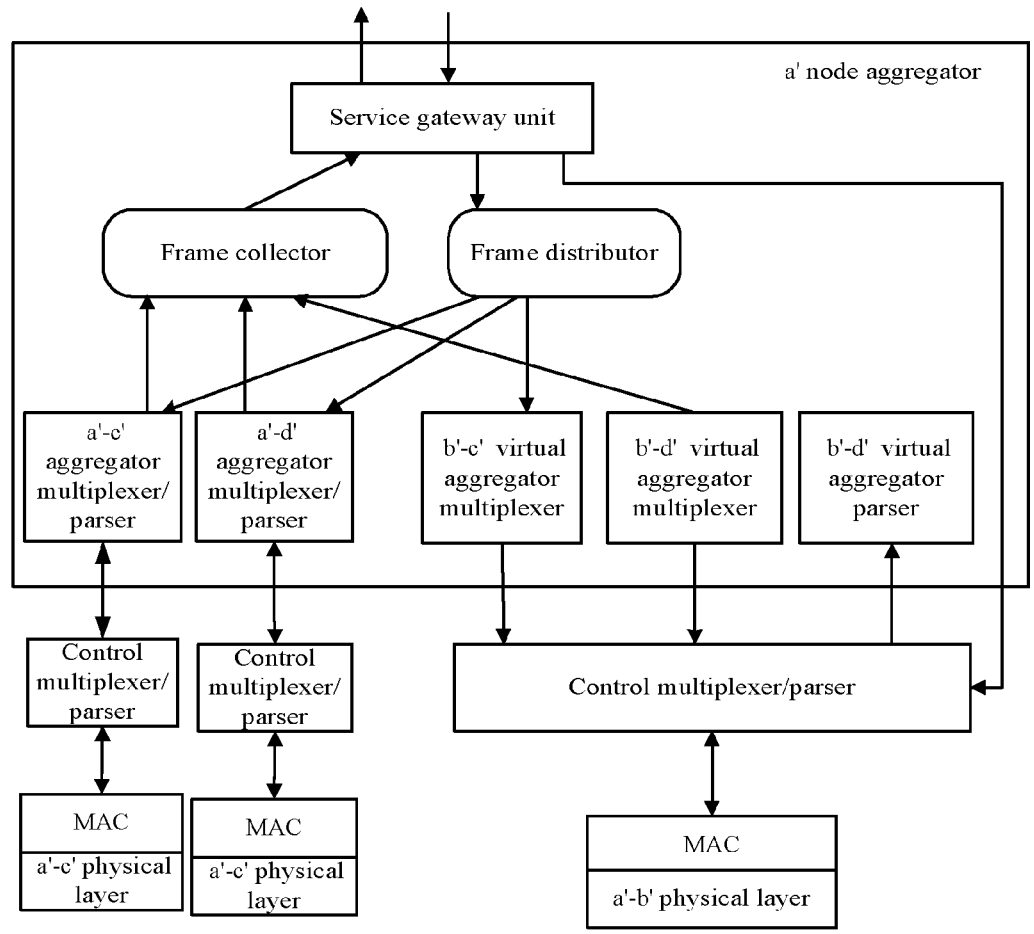
FIG. 11 is a structural schematic diagram of the internal logic of the aggregator of node a' after the LICP completes interaction according to example 2 of the disclosure.

Therefore, b' notifies its own aggregation information to a' through LICP protocol, and likewise, a' also notifies its own aggregation information to b' through LICP protocol. Here, usually this information can be carried through TLV, the TLV format in this embodiment can be as shown in FIG. 8, and the aggregation informations are placed in the aggregation link field. When there is still no aggregation link in the system of this node, this field may not be carried. In another manner, this field can be carried as one TLV independently, that is, the TLV shown in FIG. 6 is divided into two TLVs, as shown in FIG. 7.

a' receives the link information sent from b' about the aggregation of b' and d' and the aggregation of b' and c', and therefore, one virtual aggregator multiplexer/parser receiver b'-d' and two virtual aggregator multiplexer/parser senders b'-d' will be created in the aggregator of a', which are respectively b'-d' and b'-c'. Therefore, there will be four aggregation multiplexers/parsers in the aggregator of node a, as shown in FIG. 11, when node a sends traffic to the network interconnection port, the traffic is actually sent via such an aggregator. The aggregator will select from these four aggregation multiplexers/parsers when sending traffic, if the aggregator multiplexer/parser of node a itself is selected, then the traffic runs along link a'-c'; and if the virtual aggregator multiplexer/parser created for link b'-d' or b'-c' is selected in this aggregator, then the traffic will be sent out from port a'-b' and transmitted on link b'-d' by b'.

When one of the links has failed, such as link b'-d' has failed, then b' will send an LICP to notify a' via intra-portal link b'-a'. Here, there are various notification methods, one is that b' sends to a' an LICP protocol which has an aggregation link field with a specific flag bit (as shown in FIGS. 6 and 7), here the specific flag bit (action) can be placed in the aggregation link field, and when action=1, it indicates that this link needs to be removed; and when action=0, it indicates that this link needs to be added into the aggregator, as shown in FIG. 8. Therefore, a' will delete the virtual aggregator multiplexer/parser sender b'-d' corresponding to link b'-d' from aggregator a', and at this moment, the aggregator of a' has aggregator multiplexer/parser a'-c', aggregator multiplexer/parser a'-d' and aggregator multiplexer/parser b'-c', and all the traffic is shunted from these three aggregation multiplexers/parsers, and the traffic which is to be forwarded from link b'-d' originally will also be reallocated in these three aggregation multiplexers/parsers, thus realizing protection to b'-d'.

a' and b' also need to intercommunicate information of frame-to-gateway assignment and/or frame-to-aggregation port between these two nodes through LICP. It is assumed that the gateway is node A if the VID of the traffic is in the range of 1-2000, and the gateway is node B if the VID of the traffic is in the ranger of 2001-4095. When the traffic with VID=100 incomes from the network interconnection interface of node A, this traffic will be directly sent from node A to network 11; and if the traffic of this service incomes from the network interconnection interface of node B, this traffic will be sent to the intra-portal interface between a' and b' by the gateway selection module of b', thus node A receives this traffic and then forwards same to network 11.

In addition, here, a' and b' can form an aggregation group only via the intra-portal link, and at this moment, their aggregation parameters are system id, system priority transmitted through LICP. However, once the intra-portal link has failed, that is, a' and b' cannot be aggregated into an aggregation group, there can be the following two choices:

1) a' and b' takes their own node ids and node priorities as the system ids and system priorities for aggregation to aggregate again with c' and d' of the peer network.

2) since the node priority of a' is higher than that of b', a' will remain the original aggregation parameters thereof and continue to retain the aggregation with c'. While b' will modify some system parameters thereof, such as system id, system priority and so on, thus this node no longer belongs to this DLAG.

Service 2001-4095 which are used as gateways by b' originally will be allocated to a', that is, in this DLAG, a' is the gateway of all services.

Example 3

Figure 12:
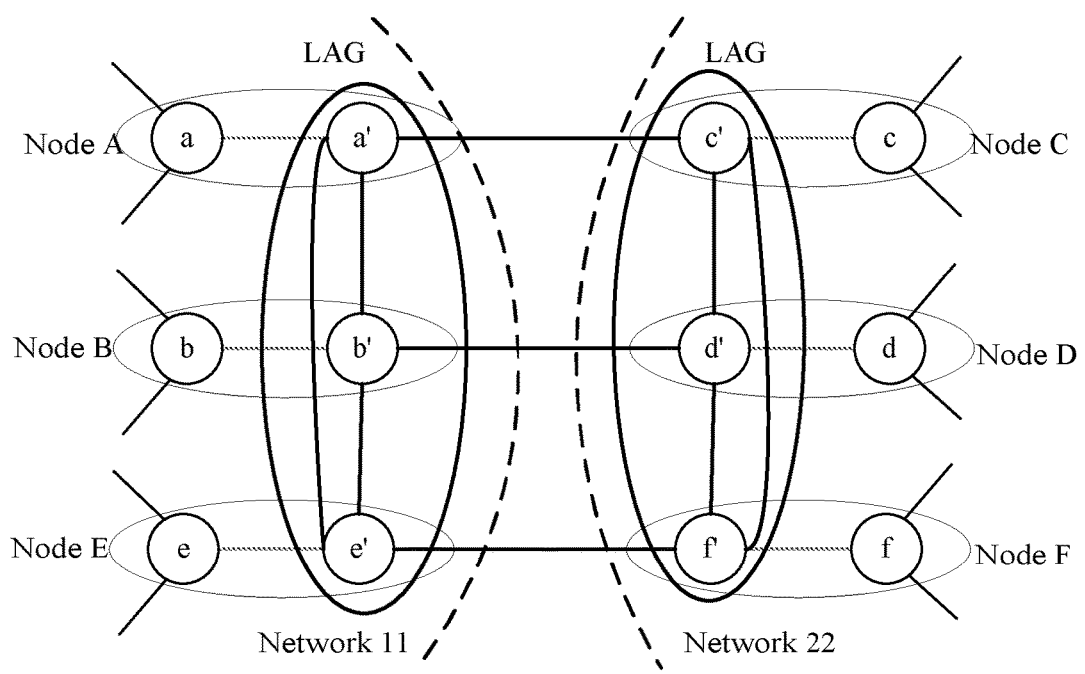
FIG. 12 is a network connection topology diagram according to example 3 of the disclosure.

With reference to the network connection topology diagram shown in FIG. 12, the network at each side has more than two edge nodes. In this embodiment, network side 11 has three nodes A, B and E3, network side 22 has three nodes C, D and F3, and network 11 and network 22 are connected to each other through these 6 nodes. In order to realize protection to two network interconnection interfaces of network 11 and network 22, here, we can aggregate a', b' and e' into a DLAG, and likewise, aggregate c', d' and f' into a DLAG. Therefore, there should be an intra-portal link connection among a', b' and c' to perform internal information interaction and state coordination of one DLAG; and there also should be an intra-portal link connection among c', d' and f'. At this moment, in this embodiment, there are three aggregation links in the DLAG, via which aggregation links traffic protection and load sharing are realized.

The aggregation process is similar to examples 1 and 2, a', b' and e' notify their own system information through LICP protocol, information such as system id, system priority, key and so on, the formats can be as shown in FIGS. 6, 7 and 9, and only when these values are the same, these nodes can be aggregated into a DLAG.

Figure 13:
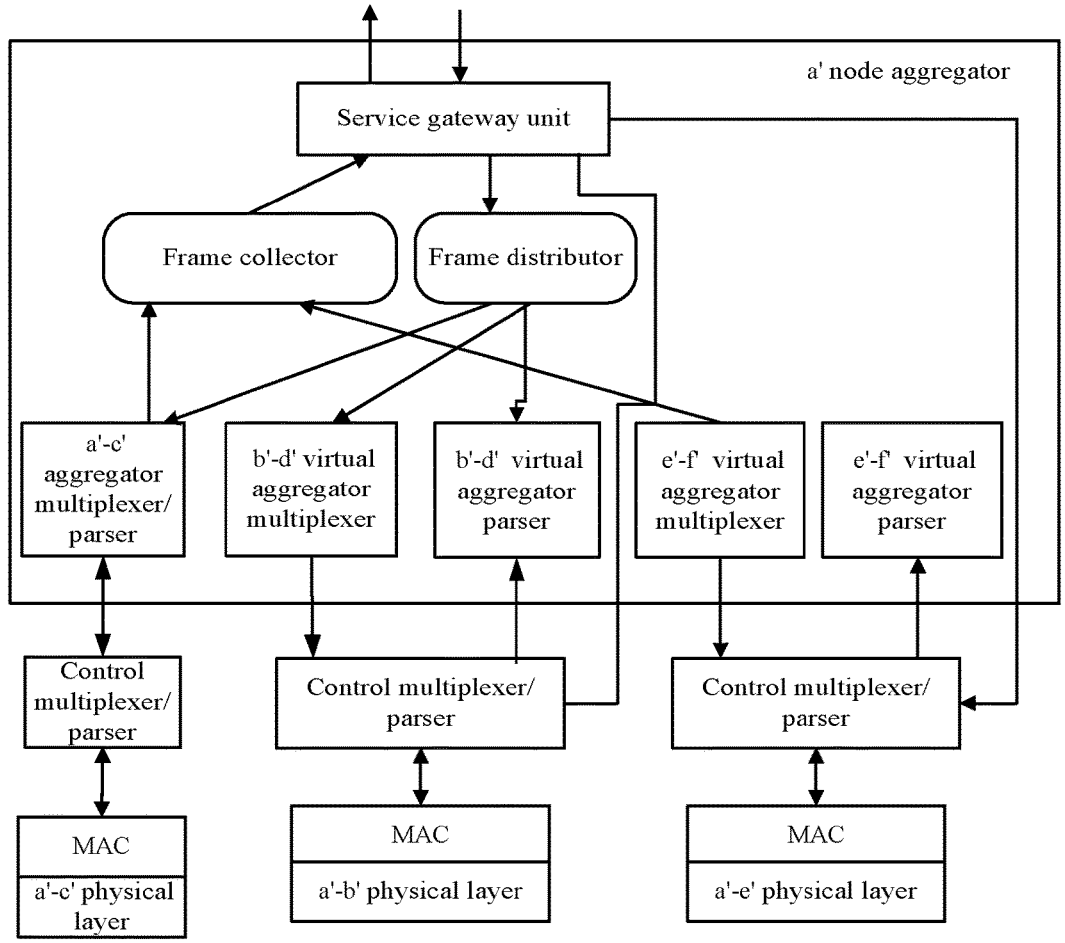
FIG. 13 is a structural schematic diagram of the internal logic of the aggregator of node a' after the LICP completes interaction according to example 3 of the disclosure.

Therefore, b' notifies its own aggregation information to a' through LICP protocol, and likewise, e' notifies its own aggregation information to a' through LICP protocol, and a' also notifies its own aggregation information to b' and e' through LICP protocol. Here, usually this information can be carried through TLV, the TLV format in this embodiment can be as shown in FIG. 6, and the aggregation informations are placed in the aggregation link field. When there is still no aggregation link in the system of this node, this field may not be carried. In another manner, this field can be carried as one TLV independently, that is, the TLV shown in FIG. 6 is divided into two TLVs, as shown in FIG. 7.

a' receives the link aggregation information sent from b' and e' about the aggregation of b' and d' and the aggregation of e' and f', and therefore, 1 virtual aggregator multiplexer/parser receiver b'-d' and 1 virtual aggregator multiplexer/parser sender b'-d' will be created in the aggregator of a'; and at the same time, 1 virtual aggregator multiplexer/parser receiver e'-f' and 1 virtual aggregator multiplexer/parser sender e'-f' will also be created. Therefore, there will be 3 aggregation multiplexers/parsers in the aggregator a', as shown in FIG. 13, when node a sends traffic to the network interconnection port, the traffic is actually sent via such an aggregator. The aggregator will select from these three aggregation multiplexers/parsers when sending traffic, if the aggregator multiplexer/parser of node a itself is selected, then the traffic runs along link a'-c'; and if the virtual aggregator multiplexer/parser created for link b'-d' or e'-f' is selected in this aggregator, then the traffic will be sent out from intra-portal port a'-b' or intra-portal port a'-e and transmitted on link b'-d' by b' or transmitted on link e'-f' by e'.

When one of the links has failed, such as link b'-d' has failed, then b' will send an LICP to notify a' via intra-portal link b'-a'. Here, there are various notification methods, one is that b' sends to a' an LICP protocol which has an aggregation link field with a specific flag bit (as shown in FIGS. 8 and 10), here the specific flag bit (action) can be placed in the aggregation link field, and when action=1, it indicates that this link needs to be removed; and when action=0, it indicates that this link needs to be added into the aggregator, as shown in FIG. 8. Therefore, a' will delete the virtual aggregator multiplexer/parser sender b'-d' corresponding to link b'-d' from aggregator a', and at this moment, the aggregator of a' has aggregator multiplexer/parser a'-c' and virtual aggregator multiplexer/parser e'-f', and all the traffic is shunted from these two aggregation multiplexers/parsers, and the traffic which is to be forwarded from link b'-d' originally will also be reallocated in these two aggregation multiplexers/parsers, thus realizing protection to b'-d'.

a', b' and e' also need to intercommunicate information of frame-to-gateway assignment and/or frame-to-aggregation port between these three nodes. Assuming that the gateway is node A if the VID of the traffic is in the range of 1-1365, the gateway is node B if the VID of the traffic is in the range of 1366-2730, and gateway is node E if the VID of the traffic is in the range of 2731-4095. When the traffic with VID=100 incomes from the network interconnection interface of node A, this traffic will be directly sent from node A to network 11; and if the traffic of this service incomes from the network interconnection interface of node B, this traffic will be sent to the intra-portal interface between a' and b' by the gateway selection module of b', thus node A receives this traffic and then forwards same to network 11. Likewise, if the traffic of this service incomes from the network interconnection interface of node E, then this traffic will be sent to the intra-portal interface between e' and a' by the gateway selection module of e', thus node A receives this traffic and then forwards same to network 11.

There are various service assignment manners in this example, which is not limited to the assignment algorithm employed in this example.

In addition, here, a' and b', b' and e' and a' and e' can form an aggregation group only via the intra-portal link, and at this moment, their aggregation parameters are system id, system priority transmitted through LICP. However, once the intra-portal link has failed, this aggregation group will change. In this example, assuming that the intra-portal link between a' and b' has failed, then a' and b' cannot perform information interaction, and at this moment, a' and b' cannot belong to the same aggregation group. Since the node priority of a' is higher than that of b', a' will remain the original aggregation parameters thereof and continue to retain the aggregation with c'. While b' will modify some system parameters thereof, such as system id and system priority and so on, which will no longer belong to this DLAG, and the system id and system priority sent to e' by b' through LICP are different from the parameters of e', and e' will not deem that b' no longer belongs to the same DLAG as it, at this moment, only a' and e' belong this DLAG.

Service 1366-2730 which are used as gateways by b' originally will be allocated to a' and e', and a' and e' can complete the service assignment which belongs to b' originally through LICP negotiation.

Embodiment 2

Figure 14:
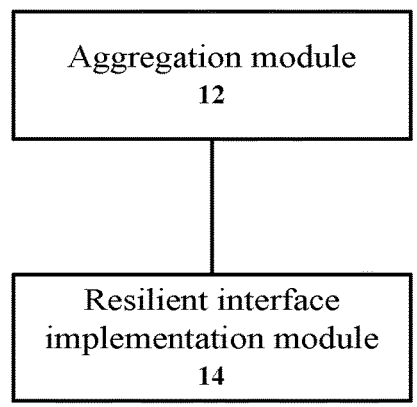
FIG. 14 is a structural block diagram of a system for implementing a distributed resilient network interface according examples 1, 2 and 3 of the disclosure.

This embodiment provides a system for implementing a resilient network interface, and referring to FIG. 14, this system includes: an aggregation module 12 and a resilient interface implementation module 14, where the functions of each module are as follows.

The aggregation module 12, configured to aggregate one or multiple aggregation ports on one or multiple nodes into a distributed link aggregation group (DLAG).

Here, the one or multiple nodes are located in the same network and connected to one or multiple nodes of another network. They can also be located in different networks or located inside of one network. When the one or multiple nodes are located in the same network and connected to one or multiple nodes of another network, the aggregated DLAG is preferably a distributed resilient network interconnection interface which is used for transmitting the traffic inside the network to the external of the network, or transmitting the traffic outside the network to the internal of the network, and implementing the protection to the traffic between the internal and external of the network.

For example, one LIC is contained in each node, wherein the LIC unit is used for the exchange of parameters and coordination of information among the nodes; and the LIC unit ensures that multiple aggregation ports on the one or multiple nodes can work as one DLAG. Based on this, the aggregation module 12 includes: an LIC unit configuration sub-module, configured to contain a link internal coordinator (LIC) unit on each of the one or multiple nodes, wherein the LIC unit is used for the exchange of parameters and the coordination of information among the nodes; and an aggregation sub-module, configured to ensure, by the LIC unit, that the multiple aggregation ports on the one or multiple nodes can work as one DLAG.

The LIC unit being used for the exchange of parameters and the coordination of information among the nodes includes: exchanging the aggregation parameters among the nodes through the LIC unit; and exchanging the aggregation port information among the nodes through the LIC unit. The aggregation parameters include system id, system priority and system key and so on, or further include node parameters, and the node parameters include: node id, node priority and so on.

The LIC unit ensuring that multiple aggregation ports on the one or multiple nodes can work as one DLAG may further include: under the coordination of the LIC unit, the one or multiple nodes obtaining consistent aggregation parameters; and under the coordination of the LIC unit, the one or multiple nodes exchanging the aggregation port information, and adding multiple aggregation ports thereof to the DLAG. The aggregation sub-module includes: an aggregation sub-unit, configured to, exchange the aggregation parameters through the LIC units among the multiple nodes and perform negotiation, and when consistent aggregation parameters are get, aggregate one or multiple aggregation ports on the multiple nodes into one DLAG.

Preferably, the aggregation module 12 also includes: an aggregation creation sub-module, configured to create a corresponding virtual aggregator multiplexer and virtual aggregator parser on the one or multiple nodes. This embodiment can also form by the nodes which have consistent aggregation parameters into a logic node, connect the nodes which have consistent aggregation parameters, and the link used for the interaction and negotiation of the LIC unit is an intra-portal link.

Preferably, aggregating the multiple aggregation ports on the nodes into one DLAG includes: creating a corresponding virtual aggregator multiplexer and virtual aggregator parser on the nodes. For example, after receiving the aggregation port information of other nodes, a node creates a virtual aggregator multiplexer corresponding to the aggregation links on the other nodes according to the aggregation port information, and creates a virtual aggregator parser corresponding to the other nodes, wherein the number of the virtual aggregator multiplexers and the number of aggregation ports in the aggregation port information sent by the other nodes are consistent, and one node correspond to one virtual aggregator parser.

The resilient interface implementation module 14 is connected to the aggregation module 12 and configured to implement a distributed resilient network interface by the DLAG aggregated by the aggregation module.

In this embodiment, when implementing to aggregate multiple aggregation ports on one or multiple nodes into a DLAG, the aggregation module 12 can also include: a service gateway unit configuration sub-module, configured to contain a service gateway unit, which is used for determining the gateway where the traffic inside the DLAG is located, on each of the nodes. The gateway is a specific node, by which the traffic flowing from a terminal network or flowing into the terminal network is forwarded. Based on this, the resilient interface implementation module 14 includes: a gateway determination sub-module, configured to, when the service gateway unit receives a frame from a frame collector, determine the service gateway which the frame should pass into or out of; and a frame forwarding sub-module, configured to, if the gateway determination sub-module determines that the service gateway which the frame should pass into or out of is the node where the service gateway unit is located, send the frame to the inside of the network of the node where the service gateway unit is located using the service gateway unit via a MAC relay; and if the service gateway which the frame should pass into or out of is not the node where the service gateway unit is located, send the frame to the node where the service gateway which the frame should pass into or out of using the service gateway unit via an intra-portal link. A resilient network interface can be implemented through this DLAG in the following manner.

In order to better implement the above-mentioned resilient network interface, this embodiment can also include: exchanging information of frame-to-gateway assignment and/or frame-to-aggregation port among multiple nodes through the LIC unit.

When there is an aggregation port in the nodes of the DLAG is removed, the system also includes: a deletion information notification module, configured to, when an aggregation port in the nodes of the DLAG is removed, notify other nodes, which are connected with the nodes via intra-portal links, of the information regarding an aggregation port is removed; and a deletion response module, configured to, when the other nodes receive the deletion information notification, delete the virtual aggregator multiplexer corresponding to the removed aggregation port; and once a group of virtual aggregator multiplexers corresponding to the node where the removed aggregation port is located on the other nodes are all removed, delete the virtual aggregator parser corresponding to the node where the removed aggregation port is located.

If the intra-portal link between two nodes in the DLAG has failed, the system also includes: an aggregation parameter updating module, configured to, if the intra-portal link between two nodes in the DLAG has failed, select the node with a lower node priority from the two nodes, and modify the aggregation parameters of the selected node.

In this embodiment, the LIC unit runs DLAG internal coordinator protocol (LICP). The protocol employed by LICP is based on LLDP or LACP.

In this embodiment, by way of aggregating one or multiple aggregation ports on one or multiple nodes into one DLAG and implementing a resilient network interface by the DLAG, the problem that the existing loop network protection technology cannot ensure the normal transmission of traffic in an arbitrary network is solved, which effectively ensures the normal operation of services in the network and improve the reliability of the network interface and the utilization rate of the link.

The system provided in this embodiment can also be implemented using the structure shown in FIG. 3 in embodiment 1, and the functions of each module are the same as those in embodiment 1, which will not be described here.

It can be seen from the above description that the distributed link aggregation method proposed in the embodiments of the disclosure, especially on a network interconnection interface, can not only realize protection to the links on an interconnection interface but can also realize more load sharing on the interconnection interface, thus improving the reliability of the network interconnection interface and the utilization rate of the links thereon.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for implementing a resilient network interface, characterized by comprising:
    aggregating one or multiple aggregation ports on one or multiple nodes into one distributed link aggregation group (DLAG), wherein the multiple nodes are connected with each other by intra-portal links; and
    implementing a distributed resilient network interface by the DLAG;
    aggregating the multiple aggregation ports on the one or more nodes into one DLAG comprises:
        containing a service gateway unit, which is used for determining which gateway the traffic of the DLAG should pass into or out of, on each of the one or more nodes;
    implementing the distributed resilient network interface by the DLAG comprises:
        when the service gateway unit receives a frame from a frame collector, determining which service gateway the frame should pass into or out of;
        when the service gateway which the frame should pass into or out of is the node where the service gateway unit is located, the service gateway unit sending the frame into a MAC relay for forwarding the frame to the internal of the network of the node; and
        when the service gateway which the frame should pass into or out of is not the node where the service gateway unit is located, the service gateway unit sending the frame to the node where the service gateway which the frame should pass into or out of is located via an intra-portal link.

2. The method according to claim 1, characterized in that aggregating multiple aggregation ports on the one or multiple nodes into one DLAG comprises:
    containing one DLAG internal coordinator (LIC) unit on each of the one or multiple nodes, wherein the LIC unit is used for implementing exchange of parameters and coordination of information among the multiple nodes; and
    the LIC unit ensuring that one or multiple aggregation ports on the one or multiple nodes can work as one DLAG.

3. The method according to claim 2, characterized in that the LIC unit implementing the exchange of parameters and the coordination of information among the multiple nodes comprises:
    exchanging aggregation parameters and aggregation port information among the multiple nodes through the LIC unit.

4. The method according to claim 2, characterized in that aggregating the multiple aggregation ports on the one or more nodes into one DLAG comprises:
    creating one or more corresponding virtual aggregator multiplexers and one or more corresponding virtual aggregator parsers on the one or more nodes, wherein creating one or more corresponding virtual aggregator multiplexers and one or more corresponding virtual aggregator parsers on the one or more nodes comprises:
    a node receiving the aggregation port information of other nodes, creating one or more virtual aggregator multiplexers corresponding to one or more aggregation links on the other nodes according to the aggregation port information, and creating one or more virtual aggregator parsers corresponding to the other nodes.

5. The method according to claim 1, characterized by further comprising:
    exchanging information of frame-to-gateway assignment and/or frame-to-aggregation port among multiple nodes through the LIC unit.

6. The method according to claim 4, characterized by further comprising:
    when an aggregation port in a node is removed, notifying other nodes, which are connected with the node via an intra-portal link, of information regarding an aggregation port is removed;
    the other nodes deleting the virtual aggregator multiplexer corresponding to the removed aggregation port; and once a group of virtual aggregator multiplexers, which correspond to the node where the removed aggregation port is located, on the other nodes are all removed, the other nodes deleting the virtual aggregator parser corresponding to the node where the removed aggregation port is located.

7. The method according to claim 3, characterized in that the aggregation parameters comprise system id, system priority and system key; and/or, the aggregation parameters further comprise node id and node priority.

8. The method according to claim 7, characterized by further comprising:
when an intra-portal link between two nodes in the DLAG has failed, selecting the node with a lower node priority from the two nodes, and modifying the aggregation parameters of the selected node.

9. The method according to claim 2, characterized in that the LIC unit runs link aggregation group internal coordinator protocol (LICP), and a protocol used by the LICP is based on link layer discovery protocol (LLDP) or link aggregation control protocol (LACP).

10. The method according to claim 2, characterized in that the one or multiple nodes are located in the same network and are connected to one or multiple nodes of another network; the DLAG is a distributed resilient network interconnection interface which is used for transmitting traffic inside the network to the external of the network, or transmitting traffic outside the network to the internal of the network and implementing protection to the traffic between interconnection networks on links and nodes.

11. A system for implementing a resilient network interface, characterized in that the system comprises:
an aggregation module, configured to aggregate one or multiple aggregation ports on one or multiple nodes into one distributed link aggregation group (DLAG), wherein the multiple nodes are connected with each other by intra-portal links; and
a resilient interface implementation module, configured to implementing a distributed resilient network interface by the DLAG aggregated by the aggregation module;
the aggregation module comprises:
a service gateway unit configuration sub-module, configured to contain a service gateway unit, which is used for determining which gateway the traffic of the DLAG should pass into or out of, on each of the one or more nodes;
the resilient interface implementation module comprises:
a gateway determination sub-module, configured to, when the service gateway unit receives a frame from a frame collector, determine which service gateway the frame should pass into or out of; and
a frame forwarding sub-module, configured to, when the gateway determination sub-module determines that the service gateway which the frame should pass into or out of is the node where the service gateway unit is located, send the frame to the internal of the network of the node where the service gateway unit is located using the service gateway unit via a MAC relay; and when the service gateway which the frame should pass into or out of is not the node where the service gateway unit is located, send the frame to the node where the service gateway which the frame should pass into or out of using the service gateway unit via an intra-portal link.

12. The system according to claim 11, characterized in that the aggregation module comprises:
an LIC unit configuration sub-module, configured to contain one link internal coordinator (LIC) unit on each of the one or multiple nodes, wherein the LIC unit is used for implementing exchange of parameters and coordination of information among the multiple nodes; and
an aggregation sub-module, configured to ensure, by the LIC unit, that the multiple aggregation ports on the one or multiple nodes can work as one DLAG.

13. The system according to claim 12, characterized in that the aggregation module comprises:
an aggregation creation sub-module, configured to create one or more corresponding virtual aggregator multiplexers and one or more corresponding virtual aggregator parsers on the one or more nodes.

14. The system according to claim 12, characterized by further comprising:
a deletion information notification module, configured to, when an aggregation port in a nodes of the DLAG is removed, notify other nodes, which are connected with the node via an intra-portal link, of information regarding an aggregation port is removed; and
a deletion response module, configured to, when the other nodes receive the information notification regarding the deletion, delete the virtual aggregator multiplexer corresponding to the removed aggregation port; and once a group of virtual aggregator multiplexers, which correspond to the node where the removed aggregation port is located, on the other nodes are all removed, delete the virtual aggregator parser corresponding to the node where the removed aggregation port is located.

15. The system according to claim 12, characterized in that the aggregation parameters comprise system id, system priority and system key; and/or the aggregation parameters further comprise node id and node priority.

16. The system according to claim 12, characterized by further comprising:
an aggregation parameter updating module, configured to, when an intra-portal link between two nodes in the DLAG has failed, select the node with a lower node priority from the two nodes, and modify the aggregation parameters of the selected node.

17. The system according to claim 12, characterized in that the one or multiple nodes are located in the same network and are connected to one or multiple nodes of another network; the DLAG is a distributed resilient network interconnection interface which is used for transmitting traffic inside the network to the external of the network, or transmitting traffic outside the network to the internal of the network and implementing protection to the traffic between interconnection networks on links and nodes.

18. The system according to claim 13, characterized in that the one or multiple nodes are located in the same network and are connected to one or multiple nodes of another network; the DLAG is a distributed resilient network interconnection interface which is used for transmitting traffic inside the network to the external of the network, or transmitting traffic outside the network to the internal of the network and implementing protection to the traffic between interconnection networks on links and nodes.

* * * * *